Oct. 10, 1950 E. APPLEGATE Re. 23,280

TAKE-UP OF ELECTRIC CORDS

Original Filed Nov. 12, 1946 2 Sheets-Sheet 1

EARL APPLEGATE
Inventor

By Louis Robertson Att'y.

TAKE-UP OF ELECTRIC CORDS

Original Filed Nov. 12, 1946 2 Sheets-Sheet 2

Inventor

EARL APPLEGATE

By Louis Robertson Attorney

Reissued Oct. 10, 1950

Re. 23,280

UNITED STATES PATENT OFFICE 23,280

TAKE-UP OF ELECTRIC CORDS

Earl Applegate, Frankfort, Ind.

Original No. 2,474,566, dated June 28, 1949, Serial No. 709,324, filed November 12, 1946. Application for reissue filed November 3, 1949, Serial No. 125,368

17 Claims. (Cl. 242—77)

Matter enclosed in heavy brackets [ ] appears in the original patent but forms no part of this reissue specification; matter printed in italics indicates the additions made by reissue

In operating portable electric equipment such as vacuum cleaners, for example, the cord extending from the wall outlet to the equipment is somewhat of a nuisance. Usually the entire length of the cord is unwound from the hooks by hand; and, since most of the length is needed only for a short time, the cord is frequently lying in the way of the equipment. When the operating of the equipment is finished, the cord must again be manually wound upon the hooks.

Because of the foregoing considerations, there has long been a recognized need for practical automatic cord winding apparatus suitable for such purposes. The motor of the portable device seems to be an appropriate source of power for the winding reel, but it is not practical to couple the winding reel directly to the motor because of the high speed of the motor. Speed-reducing gearing would make it difficult to pull the cord out from the reel. It has not been practical to provide a drive through a slipping friction clutch because the constant friction between the high speed motor and the low speed or stationary reel would soon wear out any commercially reasonable friction clutch.

According to the present invention, this difficulty is overcome by using a drive through a magnetic-electric device, including magnets and an induction disk or through a fluid drive.

This alone does not *always* solve the problem, however, because such drive must be able to supply sufficient torque to wind the cord on the reel, and this amount of torque, necessarily being accompanied by an equal drag on the motor represents a power loss which is *sometimes* highly undesirable in view of the high speed of the motor.

Accordingly, this problem in turn is solved by arranging the drive so that it may be readily rendered effective or ineffective so that the power is drawn from the motor only when winding of the reel is desired.

The foregoing is accomplished with relatively simple constructions which do not unduly increase the dimensions or weight of the apparatus and which are not prohibitive from the standpoint of cost. They are furthermore believed to be substantially free from the danger of giving trouble.

Additional objects and advantages of the invention will be apparent from the following description and from the drawings in which.

Figure 2:
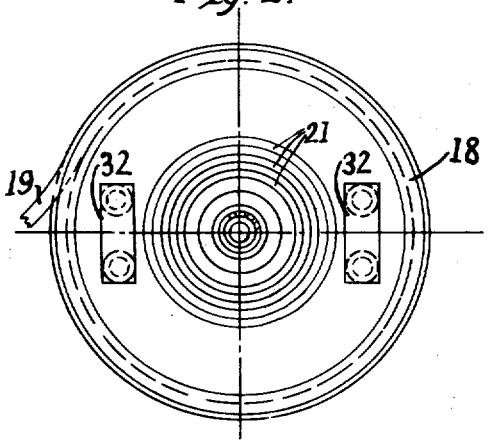
Fig. 2 is a plan view of the reel forming an important part of the invention, taken approximately on the line 2—2 of Fig. 1.
Figure 3:
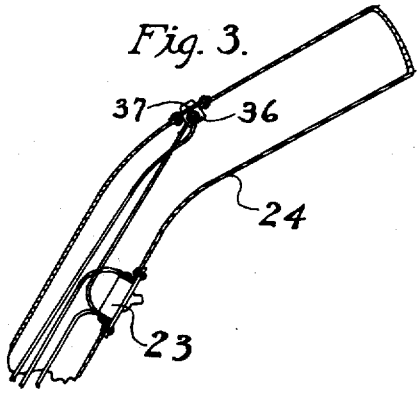
Fig. 3 is a vertical, cross-sectional view of the upper portion of the handle of the apparatus shown in Fig. 1.
Figure 1:
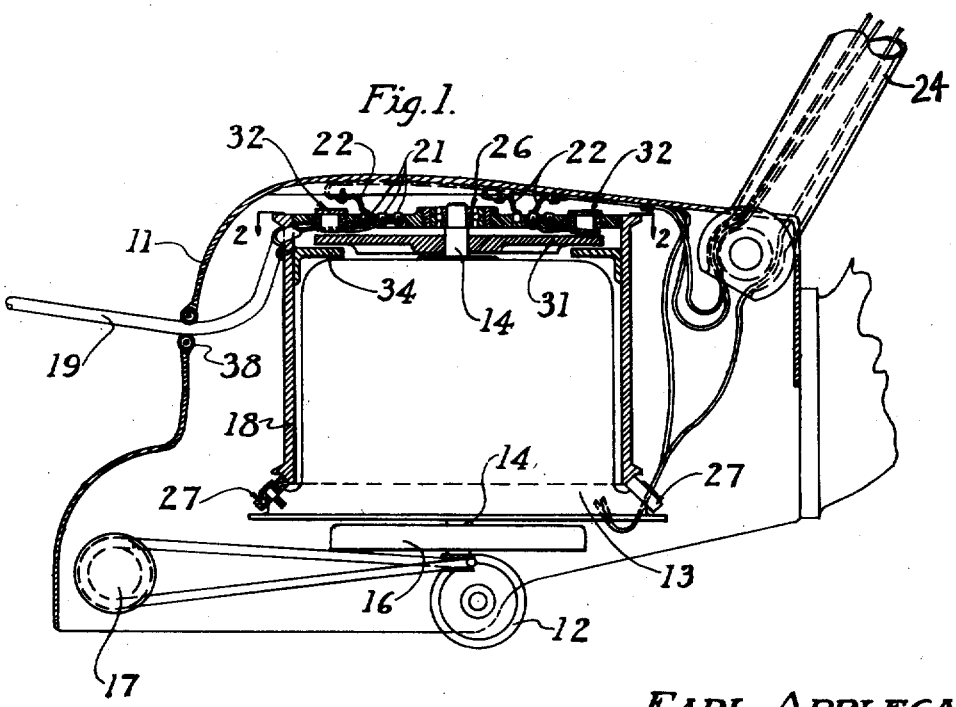
Figure 1 is a somewhat diagrammatic representation of the invention showing a vertical, cross-sectional view thereof.
Figure 6:
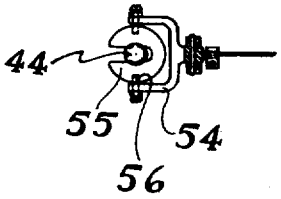
Figure 5:
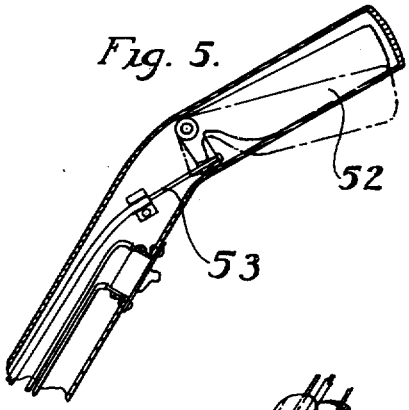
Figure 4:
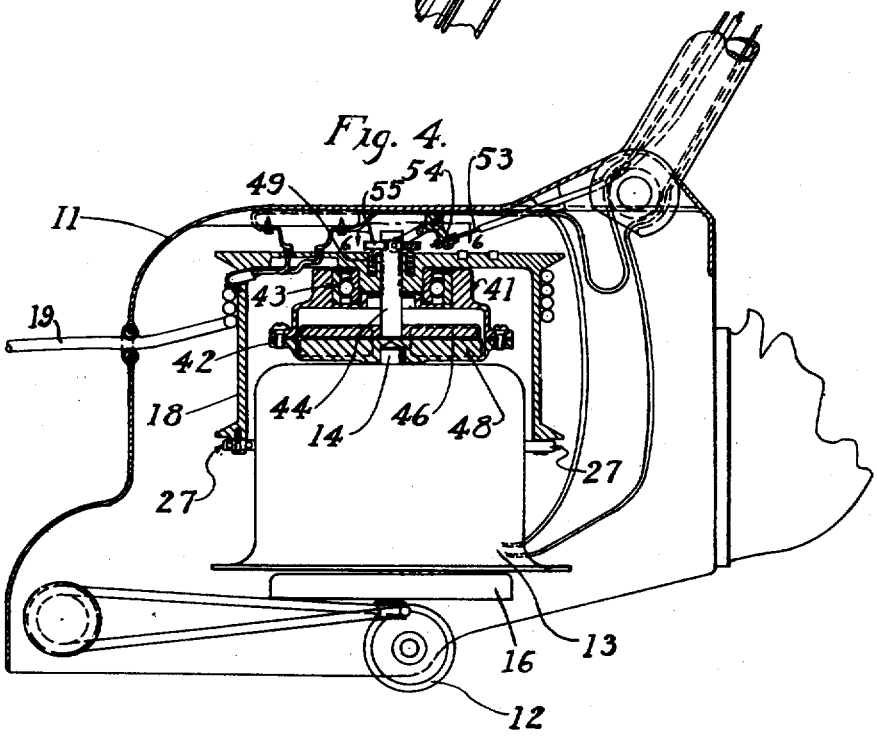

Figs. 4 and 5 are views corresponding to Figs. 1 and 3 but showing a modified form of the invention, and Fig. 6 is a fragmentary, sectional view taken approximately on the line 6—6 of Fig. 4.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

In both forms of the invention chosen for illustration the invention has been illustrated in conjunction with a vacuum cleaner including a main housing 11 operating on wheels 12. A motor 13 carried by the housing 11 drives a shaft 14 which carries an impeller diagrammatically illustrated at 16 and which may also drive a brush 17. A reel 18 is rotatably associated with the motor 13 and, according to the present invention, is driven thereby at will to wind the electric cord 19 on the reel. The connection from the cord 19 to the winding of the motor 13 may be made through two or more collector rings 21, each of which may be engaged by a suitable brush 22. A motor control switch 23 is also connected in the circuit between the brushes 22 and the winding of motor 13, the switch 23 preferably being located near the upper end of the handle 24.

In the form of the invention shown in Fig. 1, the reel 18 is rotatably carried by the upper end of shaft 14, a suitable ballbearing unit 26 being provided between the reel and the shaft 14. An inherent advantage of mounting the reel on the shaft is that any slight torque transmitted through the bearing 26 is in a direction to aid winding the cord. Hence any deterioration of the bearing will not oppose the torque exerted by the magnets and keep them from winding the reel. The reel may also be run on or be stabilized by ballbearing units 27 preferably arranged in an inclined position substantially as shown in Fig. 1. It will be understood that, although the shaft 14 rotates at high speed, the reel 18 rotates only at very low speed, so that bearings 27 are adequate.

An induction disc 31 is carried and rotated by shaft 14. This disc may be made of any suitable conductive material, but aluminum is preferred for lightness. Incidentally, it may be much thinner than has been shown. The reel 18 carries one or more electromagnets 32, preferably in balanced relationship, each magnet having a pair of poles adjacent to the induction disc 31 so that the disc rotates in the field of the magnets, when the magnets are energized.

When the magnets 32 are energized, their magnetism will produce a relative drag between the magnetic disc 31 and themselves, so that the rotation of the disc 31 will tend to rotate the reel 18. The strength of the magnets and the related factors can be such as to apply any desired rotational torque or force to the reel 18. Preferably this torque is just enough to wind up the cord with perhaps a slight marginal reserve. It is not necessary, however, that the torque be sufficient to drag the full length of cord across the floor in winding it up but only that it be enough to wind the cord up as the vacuum cleaner is moved toward the cord. However, if it is found desirable to have a greater excess of torque, that can be provided.

In view of the high speed of the disc 31 and in view of the small torque which is believed to be sufficient, the electromagnet 32 can probably be extremely weak. It may be made more efficient by providing soft iron armatures 34 beyond the disc, opposite the poles of the magnets 32. Although the magnets could be designed to be connected across the 110 volt supply wires, it is at present preferred that they have much smaller coils than this would suggest. For example, they might be operated from a small voltage such as may be obtained by a transformer, the winding of the motor or part thereof perhaps serving as a primary winding of the transformer. If the vacuum cleaner is provided with a lamp, the magnets 32 may be connected in series with the lamp, or other resistance could be used. It is probable that the coils of magnets 32 may be comprised merely of one or two turns connected in series with the motor 13, though as many turns may be used as found necessary.

Control

If the torque necessary to wind the cord 19 on the reel is maintained at all times, this would mean that at all times there would be a drag of that amount of torque between the induction disc 31 and the magnets 32.

For the motor to drive the induction disc 31 at high speed against this drag torque would require a substantial output of power in spite of the very low torque required. Perhaps the motor would have to be twice as powerful as conventional motors to supply the power required to rotate the impeller 16 and, at the same time, supply the power required to rotate the induction disc 31 against the drag torque. According to the present invention, this problem has been recognized and, in fact, part of the invention is in the choice of driving means which make controlling the drag torque possible so that it will be present only when winding the reel is desired.

The electromagnets 32 probably provide the simplest possible method of controlling the torque. If all of the magnetic metal in and associated with them is of a very soft non-retentive iron, they will exert virtually no drag on the disc when de-energized. Yet, they may be energized and de-energized simply by switch control. Preferably, their control circuit extends through a push button type of switch 36 mounted where it may readily be pressed by the thumb of the operator without moving the hand from the gripping position on the handle 24. The switch 36 may be normally open or normally closed, depending on the circuit used. Thus, if the magnets 32 are in series with the winding of motor 13, the switch 36 will normally close a shunt across magnets 32 so that they will be de-energized, this shunt being opened, to energize magnets 32, by pressing push button 37. The same might be true if the magnets 32 are in series with a lamp. On the other hand, if the magnets 32 are across the 110 volt circuit or in an independent low voltage circuit, the switch 36 would be normally opened and would be closed by pressing the push button 37.

Although only two collector rings 21 are required for connecting the cord 19 to the motor 13, three have been shown in Fig. 1 since a third is required for any type of circuit controlling the magnets 32.

In order that the torque required will be as low as possible, it is preferred that the cord 19 be drawn in through an opening bordered by rollers 38. Better still would be the provision of three or four tiny rolling bearing units, such as the units 27. So that a minimum of reel space will be sufficient, it is preferred that the cord 19 be of the slim type now common. Even if these would not be regarded as capable of withstanding sufficiently low service conditions on present vacuum cleaners, it is believed that they will prove adequate when used with the present invention because their life will be preserved by the excellent care taken of them, as a result of the fact that they can be so easily kept wound on the reel 18 except for the portion in use. It will be understood that reels of other shapes than that shown could be used, perhaps a deeper and narrower reel. Also, if a wide reel is used, as illustrated, a level winding device could be used with it although it is believed to be easy to provide enough room so that this is not necessary.

Fluid drive type

The form of the invention shown in Fig. 4 is quite similar to that of Fig. 1 except that a fluid drive unit 41 is used in place of an inducto-magnetic drive. In this instance, a fluid drive casing 42 is fast on motor shaft 14, so that the casing rotates with the shaft. The reel 18 is, accordingly, rotatably carried by the upper half of housing 42 by means of a roller bearing unit 43. Again the skirt of the reel 18 may be guided by ballbearing units 27 although, in this instance, they have been shown carried by the reel 18. Also, the showing has been simplified by showing them horizontally disposed although probably the inclined disposition of Fig. 1 would be preferred.

To drive the reel 18, the motor is provided with an axially shiftable shaft 44 splined to the reel 18. The shaft 44 carries a driven disc or rotor 46 fast thereon which forms the driven rotor of a fluid drive or clutch, the driving rotor of which is formed by the lower half of casing 42 which is preferably provided with fins 48. The rotor 46 is also preferably provided with fins.

The casing 42 is filled with oil so that with the parts in the position shown in Fig. 4 the fins 48 direct the oil against the fins of the upper rotor 46, thus driving the upper rotor and through it driving the reel 18. Inasmuch as the torque required is not large, the fluid drive device 41 of a size suggested by Fig. 4 is believed to be adequate. It could be larger, if desired, but it is quite possible that a still smaller size will be found to produce enough torque, in view of the high speed of fins 48.

To relieve the motor 13 of the drag torque represented by the driving force transmitted by fluid unit 41, it is desired that means be provided for raising and lowering the rotor 46 at will. A very small spacing is enough to almost completely remove the drag of this device.

In the illustrated form of control seen in Fig. 4, a spring 49 pressed between the reel 18 and a split washer 55 urges the shaft 44 upwardly, the washer 55 engaging an annular groove in the shaft 44. This normally raises the rotor or disc 46 far enough above the fins 48 so that substantially no drive is transmitted. When drive is desired, the hand lever 52 of Fig. 5 is operated to draw wire 53 which, as seen in Fig. 4, swings crank lever 54 counterclockwise. As seen in Fig. 6, lever 54 is provided with pins 56 to which the split washer 55 may be secured. Accordingly, squeezing the lever 52 presses the split washer 55 downwardly and lowers the upper rotor 46 close enough to the fins 48 so as to be driven by the liquid rotated thereby.

It will be observed that the drive 41 and the inducto-magnetic drive of Fig. 1 have in common the fact that they permit slippage between the high speed rotor and the substantially stationary reel, the slippage being of a type which is non-rubbing. This is important for economy and long life and avoids danger of rapid deterioration if the operator negligently holds the control in the activated position for a long time. However, it should be mentioned that a rubbing type of slippage clutch driven and controlled substantially as in Fig. 4 is probably within the broader aspects of the invention, if the invention is as broadly new as is now believed.

It is also noted that the controls shown could be used, or some similar thereto could be used, if the reel were mounted directly on the outer portion or field of the motor 13, this portion being rotatably carried so that it could move by reaction in driving the rotor of the motor. During normal operation of the device, such as the vacuum cleaner, the reaction might be too low to wind the cord on the reel, in which event, the reaction could be increased by applying a drag to the rotor, such drag perhaps being the induco-magnetic type of drag of Fig. 1 or the fluid type of drag of Fig. 4 of a frictional type of drag.

There will usually be a small length of cord still extending from the vacuum cleaner housing when the plug is pulled out of the wall outlet. This may be fastened to the handle by a suitable clip on the handle if desired. It may be preferred to extend the shaft carrying the reel through the housing and provide it with a small knob which may be turned manually to draw in the last bit of cord.

From the foregoing it is seen that a cord take-up apparatus has been provided which is suitable for use on vacuum or other portable electric devices and which will wind the cord up whenever influenced to do so by a touch on the control adjacent the operating handle of the device.

I claim:

1. A portable electric device (including a portable housing and an electric motor with a shaft carried by the housing), and cord winding apparatus including a reel rotatably carried by the motor with its axis extending in axial alignment with the motor shaft, a drive device including driven and drive elements, respectively, associated with the reel and motor for transmitting drive from the motor to the reel, said drive device being of a type which while driving the reel permits a substantially non-rubbing type of slippage between the motor and the reel, and the drive element being driven at full motor speed and the driven element being slip-driven thereby with such non-rubbing slippage that while its speed is a small fraction of the speed of the drive elements, the torque developed is not more than slightly in excess of enough to barely wind the cord while loose.

2. The apparatus of claim 1 including means to render the drive device effective and substantially ineffective selectively.

3. The apparatus as claimed in claim 1 in which the drive device is of the electro-magnetic induction type.

4. The apparatus of claim 1 in which the drive device includes electromagnet means and an induction member magneto-inductively coupled therewith, and including switch means for selectively energizing or deenergizing the electromagnet.

5. The apparatus of claim 1 in which the drive device is fluid coupled.

6. The apparatus of claim 1 in which the drive device comprises fluid coupled drive and driven members, and means for shifting one of said members to effectuate the drive means or render it ineffective at will.

7. The apparatus of claim 1 in which the reel is carried at least in part by a bearing on said shaft.

8. A portable electric device including a wheel-carried motor with a rotatable motor shaft for driving a working element with direct drive at motor speed, and cord winding apparatus including a reel rotatably carried by the motor with its axis extending in axial alignment with the motor shaft, a drive device including driven and drive elements, respectively, associated with the reel and motor for transmitting drive from the motor to the reel, said drive device being of a type which while driving the reel permits a substantially non-rubbing type of slippage between the motor and the reel, and the drive element being driven at full motor speed and the driven element being slip-driven thereby with such non-rubbing slippage that while its speed is a small fraction of the speed of the drive elements, the torque developed is not more than slightly in excess of enough to barely wind the cord while loose.

*9. A portable electric device including a wheel-carried motor with a rotatable motor shaft for driving a working element forming part of the device and assisting in the performance of the primary work of the device, and cord winding apparatus including a reel rotatably carried by the device, a drive device including driven and drive elements, respectively, associated with the reel and driven by the motor for transmitting drive from the motor to the reel, said drive device being of a type which while driving the reel per-*

*mits a substantially non-rubbing type of slippage between the drive element and the reel, and the drive element being driven with a peripheral speed at least equal to the peripheral speed of the motor shaft and the driven element being slip-driven thereby with such non-rubbing slippage that while its speed is a small fraction of the speed of the drive elements, the torque developed is not more than slightly in excess of enough to barely wind the cord while loose.*

*10. The apparatus of claim 9 in which the drive device includes magnet means and an induction member, one of which is mounted on a rotating shaft forming part of the appliance drive, and the other of which is coaxial therewith and rotated inductively thereby.*

*11. The apparatus of claim 10 in which the reel is carried at least in part by a bearing on said last named rotating shaft.*

*12. The apparatus of claim 9 in which the drive device is of the magnetic induction type.*

*13. The apparatus of claim 9 including means to render the drive device effective and substantially ineffective selectively.*

*14. The apparatus of claim 9 in which the drive device includes electromagnet means and an induction member magneto-inductively coupled therewith, and including switch means for selectively energizing or deenergizing the electromagnet.*

*15. The apparatus of claim 9 in which the drive device is fluid coupled.*

*16. The apparatus of claim 9 in which the drive device comprises fluid coupled drive and driven members, and means for shifting one of said members to effectuate the drive means or render it ineffective at will.*

*17. A portable electric device including a wheel-carried motor with a rotatable motor shaft for driving a working element forming part of the device and assisting in the performance of the primary work of the device, and cord winding apparatus including a reel rotatably carried by the device, a drive device including driven and drive elements, respectively, associated with the reel and driven by the motor for transmitting drive from the motor to the reel, said drive device being of a type which while driving the reel permits a substantially non-rubbing type of slippage between the drive element and the reel, and the drive element being driven at a high speed and the driven element being slip-driven thereby with such non-rubbing slippage that while it is stationary the torque developed is not more than slightly in excess of enough to barely wind the cord while loose.*

EARL APPLEGATE.

REFERENCES CITED

The following references are of record in the file of this patent or the original patent:

UNITED STATES PATENTS

| Number | Name | Date |
|---|---|---|
| 1,862,267 | Honig | June 7, 1932 |
| 1,921,288 | Farmer et al. | Aug. 8, 1933 |
| 1,978,082 | Harwood et al. | Oct. 23, 1934 |
| 2,002,629 | Cobb et al. | May 28, 1935 |
| 2,254,221 | Hubbard | Sept. 2, 1941 |
| 2,365,691 | Fodor | Dec. 26, 1944 |

FOREIGN PATENTS

| Number | Country | Date |
|---|---|---|
| 189,905 | Great Britain | Dec. 14, 1922 |